United States Patent [19]

Hammer

[11] 4,176,552

[45] Dec. 4, 1979

[54] FIBER-OPTIC THERMOMETER

[75] Inventor: Jacob M. Hammer, Plainsboro, N.J.

[73] Assignee: RCA Corporation, New York, N.Y.

[21] Appl. No.: 949,435

[22] Filed: Oct. 10, 1978

[51] Int. Cl.² .............................................. G01K 5/04
[52] U.S. Cl. ................................ 73/339 R; 73/355 R; 73/368
[58] Field of Search ................ 73/339 R, 353, 355 R, 73/355 EM, 356, 362 R, 368, 368.1, 368.2, 368.3, DIG. 11; 250/343, 344, 345, 577; 356/135, 136

[56] References Cited

U.S. PATENT DOCUMENTS

| | | | |
|---|---|---|---|
| 3,639,770 | 2/1972 | Zizdmann | 356/136 X |
| 3,810,065 | 5/1974 | Welsh | 73/368 X |
| 3,871,232 | 3/1975 | Pickett et al. | 73/356 |
| 3,960,017 | 6/1976 | Romanowski | 73/362 R |
| 4,016,761 | 4/1977 | Rozzell et al. | 73/356 |
| 4,036,060 | 7/1977 | Deficis | 73/368 |
| 4,111,050 | 9/1978 | Waddoups | 73/356 X |
| 4,136,566 | 1/1979 | Christensen | 73/356 |

Primary Examiner—Donald Watkins
Attorney, Agent, or Firm—George J. Seligsohn; Samuel Cohen

[57] ABSTRACT

A species of fiber-optic thermometer, employing input and output fiber-optics immersed in a given liquid partially filling a capillary, transfers a proportion of fiber-optic input light to the fiber-optic output as a single-valued function of temperature. This species can provide a miniature thermometer exhibiting high temperature sensitivity.

7 Claims, 3 Drawing Figures

FIBER-OPTIC THERMOMETER

This invention relates to fiber-optic thermometers and, more particularly, to a species of fiber-optic thermometer employing a temperature-sensitive medium which includes a liquid having the fiber-optic input and the fiber-optic output of the thermometer immersed therein.

The need for a remotely read thermometer having a miniature size temperature-sensitive region has been recognized. For instance, the electromagnetic localized heating (hyperthermia) of cancerous tissue requires a miniature, non-conductive thermometer to indicate the temperature of the heated tissue. Such a miniature, non-conductive thermometer 15 also is useful in connection with a microwave oven.

To meet such needs, a fiber-optic thermometer already has been proposed. As known in the art, a fiber-optic thermometer comprises a fiber-optic input for applying input light, a fiber-optic output for extracting output light, and a temperature-sensitive medium optically coupling the fiber-optic input and fiber-optic output for transferring a proportion of the applied input light from the fiber-optic input to the fiber-optic output. Since the size of the transferred proportion is a single-valued function of the temperature of the medium, the temperature may be indicated by detecting the amount of extracted output light. In the past, the temperature-sensitive medium has comprised a reflecting liquid having a predetermined temperature coefficient of expansion. In particular, the spacing distance between the surface of this liquid and the respective fiber-optic input and fiber-optic output varies with temperature. Therefore, the proportion of input light from the fiber-optic input that is reflected from the surface of the liquid into the fiber-optic output is a single-valued function of the aforesaid spacing distance and, hence, of the temperature of the liquid.

The problem with this known species of fiber-optic thermometer is that it exhibits a low temperature-sensitivity. One reason for the low temperature-sensitivity is that a liquid inherently has a relatively small temperature coefficient of expansion. A new species of fiber-optic thermometer, which forms the subject matter of U.S. patent application Ser. No. 949,428 (RCA 72,511), filed on even date herewith by Hammer and assigned to the assignee as the present application, solves the problem of low temperature-sensitivity by employing a trapped gas column (rather than a liquid) as its temperature-sensitive medium, the gas column supporting a gas-sealing movable reflecting element.

However, any type of fiber-optic thermometer which depends on the spacing distance of a reflecting surface from the fiber-optic input and the fiber-optic output inherently exhibits a small optical coefficient between the fiber-optic input and the fiber-optic output (i.e., the slope defined by the ratio of the percentage change in output light extracted from the fiber-optic output to the change in the spacing distance is inherently small).

The improved fiber-optic thermometer disclosed and claimed herein utilizes as a temperature-sensitive medium a fixed amount of a given liquid situated within and partially filling a capillary having a certain length, the liquid exhibiting a predetermined temperature coefficient of expansion. In this respect, the present invention is similar to the prior art. However, in accordance with the principles of the present invention, the fiber-optic input and the fiber-optic output extend in spaced relationship with respect to each other into the capillary in a direction along the length thereof with a portion of each of the fiber-optic input and fiber-optic output being immersed in the liquid. Thus, the length of the immersed portion of each of the fiber-optic input and fiber-optic output is a single-valued function of the temperature of the given liquid. Further, the light transmission characteristic between the fiber-optic input and the fiber-optic output along the length of the liquid-filled region of the capillary is significantly different from that along the length of the unfilled region of the capillary. For example, if the liquid is transparent and exhibits an index of refraction greater than that of the fiber-optic input, the light transmission characteristic of the liquid-filled region is larger than that of the unfilled region. Alternatively, the liquid may include a light-absorbing material, so that, in this case, the light transmission characteristic of the liquid-filled region is less than that of the unfilled region. Thus, unlike the prior art, the temperature-sensitivity of the fiber-optic thermometer species of the present invention does not depend on the spacing distance of a reflecting surface from the fiber-optic input and the fiber-optic output.

Figure 1:
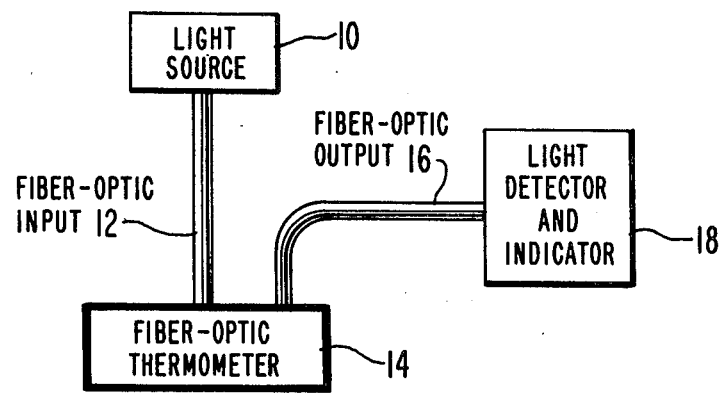
FIG. 1 is a block diagram of a fiber-optic thermometer system.

Referring to FIG. 1, light from light source 10 (which may be either visible or infra-red light) is transmitted by fiber-optic input 12 (which may contain one or more fiber-optic members) to a fiber-optic thermometer 14. Fiber-optic thermometer 14 is effective in transferring a proportion of the light in fiber-optic input 12 to fiber-optic output 16 (which may include one or more fiber-optic members). The size of this transferred proportion is a single-valued function of temperature. The output light of fiber-optic output 16, extracted from fiber-optic thermometer 14, is applied as an input to light detector and indicator 18. Light detector and indicator 18 includes a photoelectric detector, for deriving an electrical signal which has a magnitude which is a single-valued function of the intensity of light in fiber-optic 16, and an indicator for measuring the magnitude of this electrical signal. Since the intensity of the light in fiber-optic 16 depends on both the intensity of the light in fiber-optic input 12 and the temperature measured by fiber-optic thermometer 14, it is necessary to calibrate the indicator of light detector and indicator 18 in accordance with the absolute magnitude of the light intensity from light source 10. Although this can be done manually, it is preferably done automatically in the manner shown in FIG. 1a.

Figure 1A:
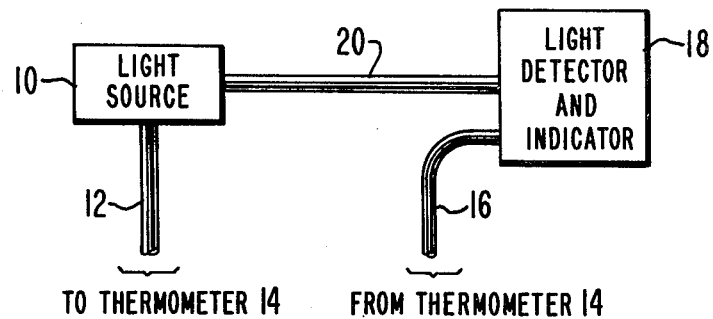
FIG. 1a illustrates a modification of the fiber-optic thermometer system of FIG. 1.

Referring to FIG. 1a, light detector and indicator 18, besides receiving output light from thermometer 14 through fiber-optic output 16, also receives reference light directly from light source 10 through fiber-optic 20. In this case, light detector and indicator 18 includes a second photoelectric detector for detecting the intensity of this reference light for normalizing purposes. Specifically a signal derived from the second photoelectric detector may be used as a gain-control signal for making the indication from light detector and indicator 18 independent of the absolute intensity of the light from light source 10, and dependent solely on the proportion of the fiber-optic input light transferred from input 12 to output 16 (i.e., dependent solely on the temperature measured by thermometer 14).

Figure 2:
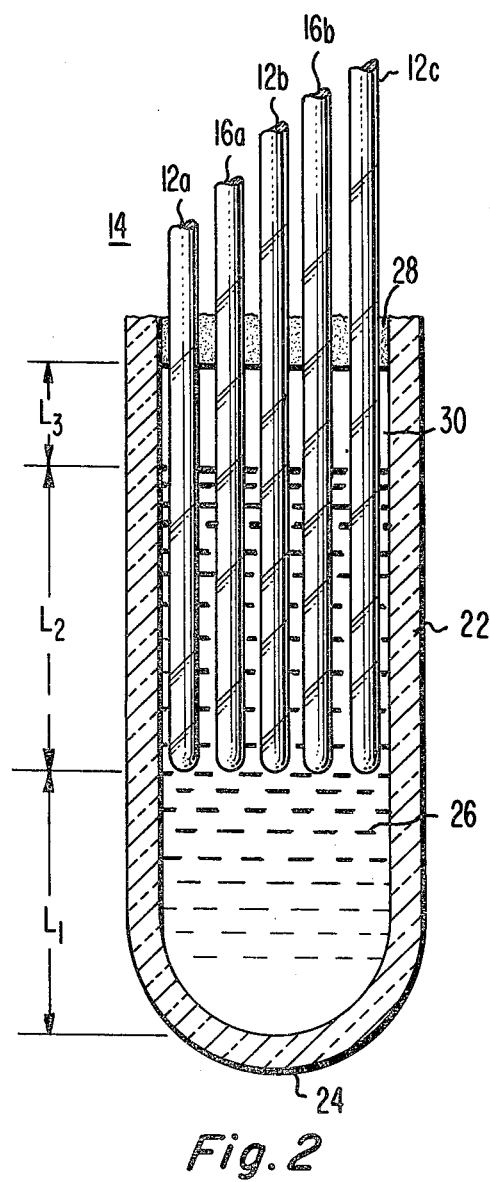
FIG. 2 illustrates an embodiment of a fiber-optic thermometer incorporating the present invention.

Referring to FIG. 2, there is shown an embodiment of fiber-optic thermometer 14 incorporating the present invention. Specifically, in FIG. 2, thermometer 14 comprises capillary 22 having a certain length and having its lower end 24 sealed. Capillary 22 is partially filled with a fixed amount of given liquid 26 which exhibits a predetermined temperature coefficient of expansion. Given liquid 26 possesses certain other characteristics which are discussed below in detail.

Fiber-optic input 12 (comprising in FIG. 2 fiber-optics 12a, 12b and 12c) and fiber-optic output 16 (comprising in FIG. 2 fiber-optics 16a and 16b) pass through top seal 28 and extend in spaced substantially parallel relationship with respect to each other into capillary 22 in a direction along the length thereof with a portion of substantially the same length each fiber-optic of the fiber-optic input and each fiber-optic of the fiber-optic output being immersed in given liquid 26. The volume of given liquid 26, and hence the length of the immersed portion of each fiber-optic of the fiber-optic input and fiber-optic output, is a single-valued function of the temperature of given liquid 26.

As shown in FIG. 2, given liquid 26 completely fills the volume of a lower portion of capillary 22 having a length $L_1$. In addition, given liquid 26 fills the interstices between the wall of capillary 22 and fiber-optics 12a, 16a, 12b, 16b and 12c over an intermediate portion of capillary 22 having a length $L_2$. The upper portion of capillary 22, having a length $L_3$, comprises a region 30 that is unfilled with the given liquid. Unfilled region 30, which may contain air, surrounds the respective portions of the length of the fiber-optics 12a, 16a, 12b, 16b and 12c situated between the surface of given liquid 26 and seal 28.

As the volume of given liquid 26 increases in response to an increase in temperature, length $L_2$ increases and length $L_3$ decreases. Similarly, when the volume of given liquid 26 decreases in response to a decreasing temperature, the length $L_2$ decreases and length $L_3$ increases. The present invention depends upon the difference in optical coupling between input fiber-optics 12, 12b and 12c and output fiber-optics 16a and 16b over length $L_2$ (which is liquid-filled) compared to that over length $L_3$ (unfilled region 30) as the temperature changes.

As is known, in order for a fiber-optic to act as a light guide, the index of refraction exhibited by the fiber-optic material must be large relative to that of its surroundings. This, of course, is the case in unfilled region 30. However, because fiber-optics 12a, 16a, 12b, 16b and 12c are unclad, some fraction of the input light traveling through the portion of the length of input fiber-optics 12a, 12b and 12c within unfilled region 30 is scattered therefrom, and some of this scattered light is coupled into output fiber-optics 16a and 16b. All other things being equal, the size of this fraction of coupled light is a direct function of the length $L_3$ of unfilled region 30.

The amount of the light coupled per unit length between the input fiber-optics and the output fiber-optics within the $L_2$ portion of capillary 22 may be increased or, alternatively, decreased with respect to that of unfilled region 30. Specifically, by employing a given liquid 26 which is transparent and which exhibits an index of refraction higher than that of fiber-optics 12a, 16a, 12b, 16b and 12c, the immersed portion of these fiber-optics no longer operate as light guides. In this case, an expansion of liquid 26, due to increase in temperature (i.e, an increase in length $L_2$ and a decrease in length $L_3$) results in an increase in extracted output light. However, if, instead, given liquid 26 is colored or opaque (so that given liquid 26 absorbs scattered light), the expansion of given liquid 26 in response to an increase in temperature results in a decrease in extracted output light.

Most of given liquid 26 is situated within the volume of the $L_1$ bottom portion of capillary 22 (since the presence of the fiber-optics takes up much of the room within the $L_2$ portion of capillary 22). However, all the change in volume due to change in temperature of given liquid 26, affect the length of the $L_2$ portion of capillary 22. Further, the change in volume of given liquid 26 per degree change in temperature is directly proportional to the total amount of given liquid 26 within capillary 22. The fixed volume of given liquid 26 within the bottom $L_1$ portion of capillary 22 operates an a reservoir to provide a relatively large change in volume of given liquid 26 per degree change in temperature. However, the change in length of the $L_2$ portion of capillary 22, due to this change in volume, depends upon the difference between the cross sectional area defined by the inner diameter capillary 22 and the sum of the cross sectional areas of each one of fiber-optics 12a, 16a, 12b, 16b and 12c (i.e., the cross sectional area of the liquid filling the interstices of the $L_2$ portion of capillary 22). As the cross sectional area occupied by these interstices become smaller, the change in lengths $L_2$ and $L_3$ per degree change in temperature (i.e., temperature sensitivity) of the fiber-optic thermometer 14 shown in FIG. 2 becomes larger. Therefore, to achieve maximum temperature sensitivity, it is desirable to employ a relatively wide diameter capillary tube (e.g., 1 mm) with a large number of closely-spaced, interleaved input and output fiber-optics. By so doing, the sum of the cross sectional areas of all the fiber-optics may be made to approach the cross section area of the inner diameter of the capillary. However, it should be understood that the present invention may be practiced by other arrangements of fiber-optics and capillary including, but not limited to, a single input fiber-optic and a single output fiber-optic and/or a relatively narrow diameter capillary.

What is claimed is:

1. In a fiber-optic thermometer comprising a fiber-optic input for applying input light, a fiber-optic output for extracting output light, and a temperature-sensitive medium optically coupling said fiber-optic input to said fiber-optic output for transferring a proportion of the applied input light from said fiber-optic input to said fiber-optic output, the size of said transferred proportion being a single-valued function of the temperature of said medium; the improvement therein:

wherein said medium comprises a fixed amount of a given liquid situated within and partially filling a capillary having a certain length, said liquid exhibiting a predetermined temperature coefficient of expansion, said fiber-optic input and said fiber-optic output extending in spaced relationship with respect to each other into said capillary in a direction along the length thereof with a portion of each of said fiber-optic input and fiber-optic output being immersed in said liquid, whereby the length of the immersed portion of each of said fiber-optic input and fiber-optic output is a single-valued function of the temperature of said given liquid, and wherein the light transmission characteristic between said fiber-optic input and said fiber-optic output along the length of the liquid-filled region of said capillary is significantly different from that along the length of the unfilled region of said capillary.

2. The thermometer defined in claim 1, wherein each of said fiber-optic input and said fiber-optic output comprises at least one fiber-optic, said fiber-optics being oriented substantially parallel to each other along the length of said capillary.

3. The thermometer defined in claim 2, wherein at least a certain one of said fiber-optic input and fiber-optic output comprises a plurality of fiber-optics, and wherein every individual fiber-optic of the other of said fiber-optic input and fiber-optic output is disposed in spaced relationship between a pair of said plurality of fiber-optics of said certain one of said fiber-optic input and fiber-optic output.

4. The thermometer defined in claim 3, wherein each of said certain one and said other of said fiber-optic input and fiber-optic output comprises a plurality of fiber-optics.

5. The thermometer defined in claim 4, wherein the total number of fiber-optics comprising said fiber-optic input and fiber-optic output is sufficiently large that the sum of the cross sectional areas of all said fiber-optics disposed within said capillary approaches the inner cross sectional area of the capillary itself, whereby the change in length of said liquid in response to temperature induced expansion is magnified.

6. The thermometer defined in claim 1, wherein said liquid is transparent to said input light and exhibits an index of refraction greater than that of said fiber-optic input, whereby said light transmission characteristic of said liquid-filled region is larger than that of said unfilled region.

7. The thermometer defined in claim 1, wherein said liquid is absorbent of said input light, whereby said light transmission characteristic of said liquid-filled region is less than that of said unfilled region.

* * * * *